Figure 1:
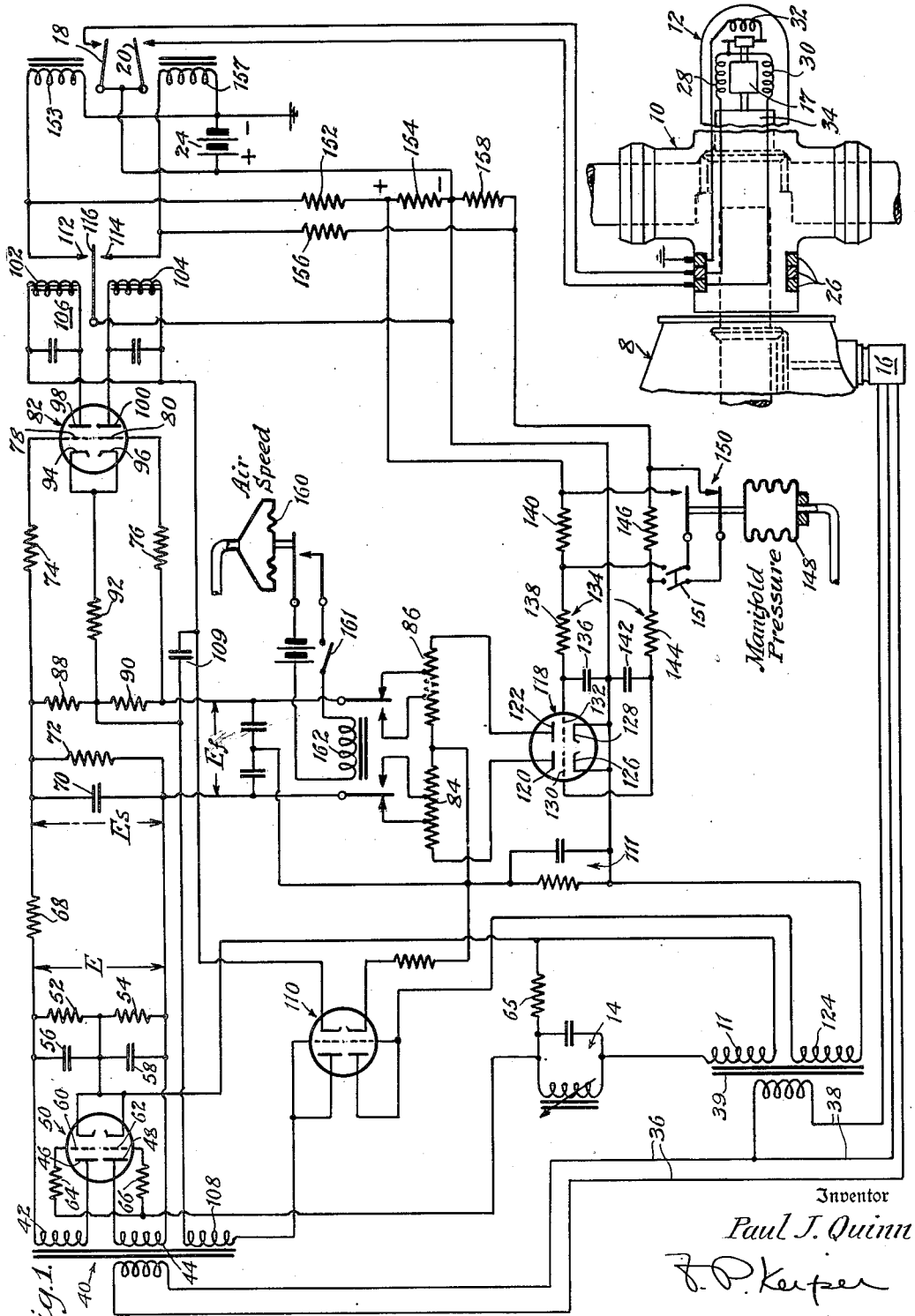

Dec. 9, 1952 — P. J. QUINN — 2,620,883
AIRCRAFT PROPELLER CONTROL SYSTEM
Filed Oct. 1, 1945 — 2 SHEETS—SHEET 1

Inventor
Paul J. Quinn
Attorney

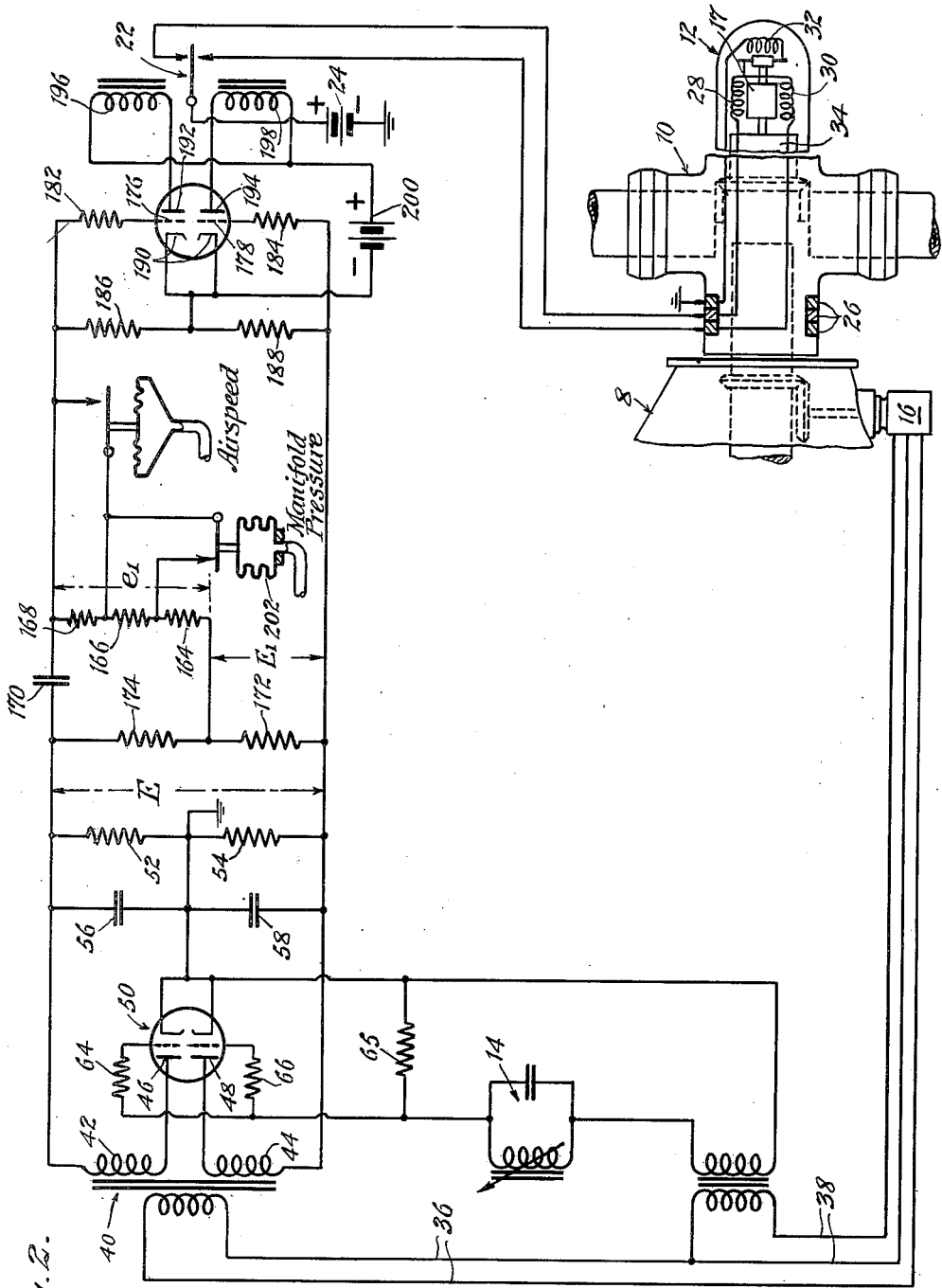

Patented Dec. 9, 1952

2,620,883

UNITED STATES PATENT OFFICE 2,620,883

AIRCRAFT PROPELLER CONTROL SYSTEM

Paul J. Quinn, South Orange, N. J., assignor to Curtiss-Wright Corporation, a corporation of Delaware Application October 1, 1945, Serial No. 619,714

8 Claims. (Cl. 170—135.72)

This invention relates to speed control systems for prime movers and more particularly to highly sensitive governor systems wherein correction is provided for unusual conditions rendering the normal operation of the governor unsatisfactory.

In such speed control systems, the time lag relationship between the speed correcting control device and engine response results in overactuation of the control before the engine reaches the desired speed, unless anticipatory or acceleration sensitive means are provided to terminate actuation of the control device a proper interval of time prior to the prime mover reaching the desired speed. By such an arrangement, hunting is avoided and the control device may require no further actuation to hold the prime mover at the steady speed ultimately attained in response to such actuation. In applications of Chillson and Schoenbaum, Serial No. 593,525, filed May 12, 1945, and Quinn, Serial No. 593,527, filed May 12, 1945, there are disclosed such acceleration and anticipatory means for rendering a governor highly sensitive to the control setting required for maintaining a desired speed. Governors also are available whose sensitivities are manually adjustable so that damping is attained at a value to match the response lag of the governed system in its usual state of operation. The three types above mentioned may all be considered as damped governor systems.

Under extreme conditions, the time lag relationship between the operation of the speed control means and the response of the prime mover varies to such an extent that the precision operation of such systems no longer obtains. While the rate of change of the control means is usually essentially constant, various factors surrounding the operation of a prime mover and its load have been found to undergo substantial variation when unusual or extreme conditions exist which produce a substantial change in the time lag relationship. In an internal combustion engine-propeller combination the indicated airspeed and intake manifold pressure are found to be indices of the time lag relationship.

Stated in another manner, a governor may be made sensitive to small offspeed indications, but the stability of the governed system depends upon the damping characteristics of the governor being in proper relation to the lag of the governed system to avoid under-correction or over-correction. In most ground-operated systems, the system lag is substantially uniform so that uniform governor damping is satisfactory. But in aircraft power plants, for example, the lag of a propeller system may vary according to the speed level at which the power plant operates, the airspeed of the aircraft, the power delivered by the power plant, the altitude and other factors. Thus to secure the proper stability in the governed system and thus proper balance between governor damping and load lag under all conditions, it becomes desirable to alter the governor damping in consonance with changes which occur in the known factors affecting load lag.

It is accordingly an object of this invention to vary the constants of a governor system for a prime mover and connected load in response to one or more indices indicative of substantial variation in conditions affecting or accompanying changes in the constants of the prime mover and connected load.

A further object of the invention is to provide in such a controlling system means simultaneously sensitive to a plurality of factors determinative of the time interval between cessation of operation of the control system and the attaining of a desired equilibrium speed of the prime mover.

Another object of the invention is to provide a system for attaining the foregoing objects by a system capable of adaptation to electronic circuits.

Still another object of the invention is to provide in an engine-propeller combination a control system sensitive to the time lag characteristics of the control and engine, and in which compensation is provided for substantial changes in the time lag characteristics of the combination due to airspeed or extreme engine load and speed conditions or both.

Yet another object of the invention is to provide a control system of the class set forth in which simplicity and ruggedness is present and in which at the same time the prime mover speed may be controlled and maintained with a high degree of precision and dispatch.

The above and other objects and novel features of the invention will appear more fully hereinafter from the following detailed description when taken in conjunction with the accompanying drawings. It is expressly understood, however, that the drawings are employed for purposes of illustration only and are not designed as definitions of the limitations of the invention, reference being had for this purpose to the appended claims.

In the drawings, wherein like reference characters indicate like parts:

Figure 1 illustrates a speed control system for an engine propeller combination in which a plurality of factors coact to establish or maintain a desired speed; and Figure 2 illustrates an alternative speed control system of a simplified form employing an acceleration ressponsive circuit.

Referring to Figs. 1 and 2 of the drawings, there will be seen a prime mover and connected load generally designated by the reference character 8, the load as illustrated comprising a variable pitch propeller 10 with a pitch-changing mechanism 12 adapted to vary the pitch of the blades of the propeller to vary the speed of or the load upon the prime mover. In such combinations, the prime mover may constitute an internal combustion engine, the throttle of which can be fixed at any desired setting during desired steady operation of the combination, or varied at will when substantial changes in power or torque output are desired. The pitch-changing mechanism illustrated is of the electric type although any type may be employed.

For the purpose of maintaining a desired speed, or causing the pitch of the propeller blades to change in order to change to a different desired speed, a tuned circuit 14 is employed, one of the constants of which may be varied in order to establish a tuned frequency bearing a relationship to the speed of the prime mover to be maintained. The prime mover is provided with a two-phase alternator 16 directly driven thereby for producing an alternating current whose frequency varies in direct proportion to the speed of the prime mover and whose frequency throughout the speed range of the prime mover is within the range of adjustment of the frequency of the tuned circuit 14.

By means of electronic circuits, a signal voltage E is produced when the resonant frequency of the tuned circuit 14 differs from the frequency of the alternator 16, which signal voltage is employed in conjunction with compensating means to cause actuation of the pitch-changing motor in such a manner as to change the load upon the prime mover to bring the prime mover to the desired speed as indicated by the adjustment of the tuned circuit 14. It will be appreciated that in an engine-propeller combination of the type set forth and in prime mover load combinations generally, there is a lag in effecting a change of speed between the actuation of the speed controlling mechanism and the subsequent attainment of the desired speed of the prime mover in response to actuation of such control and each of the circuits herein disclosed is adapted to compensate for such lag, in order to obviate hunting of the system. Not only is hunting avoided but additional factors having to do with the time lag of the system are compensated for to the end that speed corrections are effected with a minimum of delay.

The pitch-changing gear may be similar to that disclosed in U. S. Patent 1,951,320, the mechanism comprising a reversible motor 17 adapted to be operated in one direction or the other in response to the closing of the contacts of either of the relays 18 or 20 of Figure 1 or the actuation of the differential relay 22 of Figure 2 so as to close either one or the other contact thereof, the circuit in either figure being such as to deliver current from a battery 24 through slip rings 26 to one or the other of forward and reverse fields 28 and 30, and at the same time release a magnetic brake 32. The pitch-changing motor upon energization rotates the propeller blades about their axes in their respective sockets, the drive therefor being effected through a high ratio reduction gear 34.

To establish a signal voltage E, the direction and magnitude of which is a true indication of the difference between the adjusted frequency of the tuned circuit 14 and the frequency of the alternator 16, the direction being in accordance with whether the alternator frequency is greater or less than that of the frequency adjustment of the tuned circuit, a discriminator circuit is employed. Such a circuit operating from two phases 36 and 38 at 90 degrees phase relation to one another of the alternator 16 is so connected that one phase 36 is applied, through a transformer 40 having oppositely wound secondaries 42 and 44, to oppositely energize the plates 46 and 48 of the twin triode vacuum tube 50 through the resistances 52 and 54, the center tap of which is connected to the common cathode connection of tube 50. The other alternator phase 38, having a 90-degree relationship to phase 36 is provided with a transformer 39 having a secondary 11 connected through the parallel resonant or tuned circuit 14 to both grids 60 and 62 in the twin triode 50 through grid current limiting resistors 64 and 66. A high resistance shunt 65 between grids and cathodes is also provided. When zero phase shift occurs through the tuned circuit 14, that is, the alternator frequency is resonant with the tuned circuit, the flow of current through the resistors 52 and 54, and filtering capacities 56 and 58, as thus far described, is equal and opposite, resulting in a zero voltage across both resistors at E.

When the alternator frequency is higher or lower than that of the tuned circuit 14, the tuned circuit will cause a phase shift in the voltage from 90 degrees out of phase with both plate secondary voltages 42 and 44, to an unbalanced condition in which the grid voltage is more in phase with one plate than the other, depending upon whether the frequency is higher or lower, thus causing a higher current flow through one of the resistors 52 and 54 and a lower current through the other. The balance in the twin triode 50 is thus upset and a difference voltage E created whose direction and magnitude depends upon the phase shift and degree thereof. Thus far the modifications of Figures 1 and 2 are similar.

Referring particularly to Figure 1, the signal voltage E is passed through a filter network composed of a resistance or inductance 68 and capacity 70, adapted to attenuate stray frequencies and thence to a load resistance 72. The load resistance 72 is connected at its opposite ends through grid current limiting resistors 74 and 76 to the grids 78 and 80 of the twin triode 82, the connection to the resistor 76, however, including a pair of resistors 84 and 86, across which opposed potential drops are impressed. When the opposed potential drops are equal, the resistances in effect offset one another and the voltages thereacross are neutralized so that the filtered voltage $E_s$ is impressed across the grids 78 and 80 of the twin triode 82.

Grid load resistors 88 and 90 are connected across the lines leading to the grids and grid limiting resistors 74 and 76. The center tap between resistors 88 and 90 is connected through an automatic bias resistor 92 to both cathodes 94 and 96 of the dual triode 82. The plates 98 and 100 are connected to the opposed solenoids or windings 102 and 104 of a differential relay 106 and the common return of the solenoids is connected to a source of direct current furnished by the transformer secondary 108 and one-half of a twin rectifier 110. The source of current is provided with a filter 109 and is connected to the mid-connection between the grid return resistors 88 and 90 and through the cathode bias resistor 92 to the cathodes of the twin triode 82. Assuming the voltages across the resistors 84 and 86 equal and opposite when a voltage E exists the voltages impressed upon one of the grids 78 and 80 will be positive and the other negative and a greater current will be caused to pass through the plate circuit having the more positive grid, resulting in one of the solenoids 102 and 104 of the differential relay overpowering the other to close the contact 112 or 114 with the switch blade 116. Thereupon either of the relays 18 or 20 from the battery 24 is energized operating the pitch-changing motor 17 to effect a corresponding change in propeller pitch.

Since as long as there exists a voltage $E_s$, and assuming a high degree of sensitivity in the circuit thus far described, the pitch-changing motor will be caused to operate until such time as the frequency of the generator 16 and that of the tuned circuit 14 correspond and the engine is returned to "on speed." Because of the time lag characteristics of the engine-propeller combination, the pitch angle, which will have been effected during the time interval occupied by the engine in arriving at the desired speed, will not be the pitch angle for maintaining the engine on the speed desired and equilibrium will not have been established with the result that the change of speed of the engine will continue beyond the desired speed until such equilibrium is established. When this occurs the frequency of the generator 16 changes beyond the frequency of the tuned circuit 14 creating a voltage $E_s$ in opposition to that formerly existing with the result that the pitch-changing motor is then caused to operate in a reverse direction. With the high degree of sensitivity possible in a system such as has been described, the pitch-changing mechanism may be caused to reverse in a definite cycle with the engine speed lagging behind and wandering or hunting above and below the desired speed, an extremely undesirable condition.

In order to forestall hunting, the system is provided with means to stop the change of pitch before the engine speed arrives at the speed desired, and in instances the arrangement is such that the pitch-change motor may momentarily be reversed before the desired engine speed is reached if conditions are such that the desired speed may be exceeded. Where the time lag relationship is increasingly long, rather than delay the achievement of the desired speed by stopping the pitch change a sufficient time in advance to allow gradual equilibrium to take place, the pitch may be purposely changed beyond that point required for equilibrium momentarily, and then reversed to bring the pitch to the equilibrium angle, at approximately the instant the engine reaches equilibrium speed for that angle.

To accomplish the foregoing in Figure 1, a synthetic feed back voltage is developed during energization of either of the pitch-changing relays 18 and 20 and applied to the voltage $E_s$, by destroying the equalization of the opposed voltages in resistors 84 and 86 so that a differential voltage $E_f$ is set up in opposition to the voltage $E_s$. The combined voltages $E_s$ and $E_f$ may be such as to neutralize one another. The voltage $E_f$ may exceed $E_s$, and establish a reverse voltage across the grids 78 and 80. A twin triode 118, the plates 120 and 122 of which are connected to the opposite ends of resistors 84 and 86 is supplied with current from a secondary 124 of transformer 39, the other half of the twin rectifier 110, and filter 111, connections being made to the mid-connection between resistors 84 and 86 and the inter-connected cathodes 126 and 128. The grids 130 and 132 of the twin triode 118 are each connected through time delay circuits 134, each of which is composed of a capacity and resistors, the one comprising capacity 136 and resistors 138 and 140, and the other comprising capacity 142 and resistors 144 and 146.

To perform a novel feature of the invention, an engine manifold pressure-sensitive device 148 such as an expansible chamber bellows, actuates a double pole switch 150 to short circuit resistors 140 and 146 of the time delay circuits. When the absolute pressure exceeds a certain value, usually present during normal flight conditions, the bellows actuates the contacts to decrease the time constant of the time delay circuits, and thereby affect the feed back voltage in a manner to be described hereinafter.

During steady on speed operation, the battery 24, energizing resistors 152 and 154 through the coil 153 of relay 18, and resistors 156 and 158 through the coil 157 of relay 20 maintains a negative grid bias on both grids 130 and 132, so that the effective resistance of the tube 118 is high and the currents flowing through the resistors 84 and 86 are equal and low, the bias for both tubes being determined by the potential of the battery 24, and the relative values of the resistors 152 and 154 and 156 and 158. When the relay 106 is actuated to connect the switch blade 116 with either relay contact 112 or 114, either the resistors 152 and 154, or the resistors 156 or 158 are shunted and the negative grid bias of the corresponding grid is thereupon reduced to zero at a rate governed by the size of the corresponding capacity 136 or 142, and the resistors 138, 140 or 144 and 146. When the grid bias is reduced from a negative value to zero the plate current increases, the effective resistance of that half of the triode decreases, increasing the voltage drop across the corresponding resistor 84 or 86 to establish a differential voltage to be combined with the voltage $E_s$ as heretofore set forth.

By shunting resistors 140 and 146 when the engine manifold pressure is high, and removing the shunt when an abnormally low pressure exists, the time constant for discharging the capacity 136 or 142 is altered with a consequent effect on the rates of establishment of the synthetic differential voltage across resistors 84 and 86. The more quickly the synthetic voltage is built up, the sooner it neutralizes the signal voltage. When the combined voltages equal zero, the relay is opened and further pitch change is discontinued in the direction indicated as required by the signal voltage.

Another factor bearing on the time lag constant is airspeed. When airspeed is relatively high (as at high altitude), the engine-propeller time lag constant is decreased, and the anticipatory time may accordingly be decreased. To effect this result, an airspeed sensitive device 160 connected to a pitot tube is employed to actuate a relay 162 adapted symmetrically to decrease the portion of resistors 84 and 86, and the voltages thereacross, in circuit with the load resistance 72 and its signal potential, to decrease the opposing effect of the differential feedback voltage upon the potential E, and thereby shorten the anticipatory time.

An alternative method for compensation is disclosed in the modification of Fig. 2. Therein, the signal voltage E acts upon an acceleration sensitive network comprising the series of resistors 164, 166, and 168 and the capacity 170 and the load resistors 172 and 174. The serially connected load resistances 172 and 174 produce a voltage $E_1$ across resistor 172 which will be proportional to the total voltage drop E and, hence, proportional to the off speed of the engine. The resistances 164, 166 and 168 are connected through capacity 170 and the resistor 172 across the signal voltage E. The signal voltage E is impressed upon the grids 176 and 178 of the twin triode 180 through the grid resistors 182 and 184, the capacity 170 being interposed on the side of the grid 176.

It will thus be apparent that the voltage impressed across the grids through their limiting resistors will be that of the sum of the voltages $E_1$ and the voltage drop $e_1$ across resistors 164, 166 and 168. The voltage $E_1$ as noted, is proportional to the engine off speed voltage E, and is zero when the engine is on speed. The voltage $e_1$ however, appears only when the speed of the engine is changing, the magnitude of such voltage being approximately proportional to the rate of acceleration and the polarity being in one sense when the acceleration is positive and in the opposite sense when the acceleration is negative. The voltage $e_1$ will therefore be added to or subtracted from the voltage $E_1$ depending upon whether the engine speed is increasing or decreasing preferably being added when the engine speed is being increased above the reference speed and subtracted when the engine speed is being reduced from above the reference speed. The resistance 172 and the resistances 164, 166 and 168 acting conjointly thus provide a signal voltage for the grids of the twin triode 180, one component of the signal voltage being proportional to and of the same sign as the off speed of the engine, and the second component being proportional to and of the same sign as the acceleration of the engine.

Serially connected grid resistors 186 and 188 for the grids of the twin triode 180 are connected to the grid limiting resistors 182 and 184, the center connection being connected to the cathodes 190 of the twin triode. The plates 192 and 194, respectively, are connected to the coils 196 and 198 of the differential relay 22 and thence together are connected to a plate voltage supply 200 consisting of a battery as illustrated, the negative terminal of which is connected to the cathodes 190. Both sides of the twin triode are similarly biased so that when the signal voltage is zero (the engine being on speed and not changing speed) the flow of current through the plate circuits will cause the coils 196 and 198 to oppose one another in such a manner that the relay 22 will be held in the neutral position out of contact with the circuits to the pitch-changing motor open. As soon, however, as the grids of the twin triode are biased to a different degree the flow of current through the relay coils 196 and 198 will no longer be uniform and the relay 22 will be caused to energize the pitch-changing motor so as to operate in one direction or the other.

Owing to inertia, the instantaneous speed of an engine-propeller combination of the character described will lag its equilibrium speed during changes in speed in a manner known in the art. Hence, while the engine propeller combination is undergoing a change in speed, the voltage $E_1$ across the resistor 172 being proportional only to engine off speed will also lag the equilibrium speed. To provide stable operation of the governing system, the lag between the engine speed and the equilibrium speed is compensated for by the voltage $e_1$ which is produced across the resistors 164, 166 and 168 wherever there is a change in the value of E due to a change in speed. The resistances 164, 166 and 168 and the capacity 170 are so selected that the voltage $e_1$ produced by changes in E is approximately equal to the rate of change of E and thus is a function of the acceleration of the engine. The ratio of $E/E_1$ is so chosen that the sum of $E_1$ and $e_1$, when the engine is approaching governing speed, is a reasonably accurate index of the equilibrium speed of the engine for most normal conditions experienced in flight, the sum of $E_1$ and $e_1$ being connected to the relay twin triode so that the relay for controlling the pitch change motor may be controlled in accordance with the equilibrium speed of the engine propeller combination instead of the actual speed. In other words, in effecting any correction of the speed of the engine-propeller combination, the acceleration-sensitive network is operated to combine with the off speed voltage, a voltage proportional to the rate of acceleration, whereby as the equilibrium speed of the engine-propeller combination reaches the on speed level, the voltage $e_1$ across the resistances 164, 166 and 168 is equal and opposite to the voltage $E_1$ across the resistance 172. Hence the relay 22 will move to its neutral position de-energizing the pitch change motor when the voltages $E_1$ and $e_1$ are equal and opposite. Thereafter, as the engine-propeller combination progresses to an equilibrium speed the voltages across the resistance 172 and the resistances 164, 166 and 168 decay exponentially along uniform curves and are of opposite polarity. The relay will therefore remain in its neutral position during such period and for so long a period thereafter as the engine-propeller combination remains on speed.

While the above circuit as described is satisfactory for normal flight conditions, with increases in airspeed the engine-propeller time constant decreases substantially such that the value of the combined resistors 164, 166 and 168 no longer create a voltage $e_1$ of a value equal to $E_1$ at the proper instant when actuation of the pitch-changing motor should cease. In an internal combustion engine, it has also been found, that during operation when the manifold pressure is abnormally low, the time constant of the engine-propeller combination is in a similar fashion increased. In each of these extraordinary situations, it is desirable to alter the constants of the acceleration network composed of the resistors 164, 166 and 168 and the capacity 170 and there is thus provided a manifold pressure sensitive device 202 adapted under normal conditions to short-circuit a portion of the resistances 164, 166 and 168, the portion being represented by the resistance 166 so that upon a low manifold pressure the effect of the resistance 166 is included in the circuit to increase the time constant thereof. Similarly, a portion of the resistances 164, 166 and 168 and that part represented by the resistance 168 is adapted to be short-circuited upon an increase in airspeed above normal flight conditions so that the time constant of the circuit may be decreased during such conditions.

From the foregoing, it will be apparent that the systems described are operative to control an engine-propeller combination in accordance with its equilibrium speed and to be sensitive to the changes in the time constant of the combination during such abnormal conditions, the presence of which are indicated by reduced manifold pressure or high airspeed. Over-correction, with attendant hunting and constant use of the pitch-changing motor, is thus avoided while the time required to effect a desired correction is reduced to a minimum. It will be noted that the pitch of the propeller will be corrected whenever the engine speed deviates a predetermined extent from its on speed level regardless of the rate of drift and that the pitch will be corrected whenever the engine accelerates or decelerates at a rate greater than a predetermined rate even though it may be on speed when such correction is initiated. In instances in which the rate of acceleration of the engine-propeller combination in the direction of the on speed level is such that the equilibrium speed will exceed such level, the acceleration voltage or the synthetic voltage being greater than that of the signal voltage or a voltage proportional thereto at such time, the operation of the pitch controlling relays will be such as to reverse the pitch change motor even though such reversal is counter to the action indicated alone by the off speed voltage. The systems therefore have the advantage of high flexibility and enable stable control under normal operating conditions as well as extreme conditions.

In the variation of Fig. 2 both the airspeed and the manifold pressure sensitive devices act on portions of a single resistance control unit, resulting in a simplification. Such simplification may be employed in connection with the arrangement shown in Fig. 1 by providing a system wherein both the airspeed and manifold pressure sensitive devices act upon portions of the resistors 84 and 86. Additionally, if desired, both the airspeed and manifold pressure switches may be arranged to operate upon and vary the resistance of the time delay circuits 134 by varying the value of the resistances 138 and 140 and 144 and 146. It will also appear that the airspeed pressure sensitive device and the manifold pressure sensitive device may be interposed, that is, the manifold pressure device may be made to act upon the resistors 84 and 86 and the airspeed pressure device made to act upon the resistors of the time delay circuits 134. Under certain conditions of flight, it may be desirable to temporarily eliminate the automatic control of either manifold pressure or airspeed over the constants of the electrical circuits. For this purpose, a control switch such as 151 (Fig. 1) may be provided to open the shunting circuits about resistors 140 and 146. Similarly, a manually operable switch 161 may be provided in the relay circuit actuated by the airspeed pressure sensitive device to eliminate, at will, the automatic operation thereof.

In each of the circuits illustrated the constants are varied by a single fixed increment sufficient to approximate the required change, as to certain extreme conditions. While it will appear that such an arrangement is highly simple and desirable, nevertheless, the bellows acting in response to airspeed or manifold pressure can be made to actuate continuously variable resistor elements, variable in a degree proportional to the bellows movement and such as to provide a constant which varies in correspondence with the constant required for substantially exact equivalence over the range of conditions effecting the time lag relationship between the prime mover and its controls. It will also appear that while the constants have been illustrated as varied by airspeed, or manifold pressure, other measurable quantities present in a prime mover and connected load which reflect changes in the time lag relationship may be employed to vary the constants. Among such measurable quantities are engine thrust, engine torque, throttle position, rate of fuel flow, or the application of water injection as in internal combustion engine operation. Engine temperature, when reflecting load, can be employed, or the temperature of an element of the engine such as the temperature of a gas turbine blade and any one or combination of the foregoing and other variables, as will appear to those skilled in the art, may be employed.

Though several modifications have been illustrated and described, it will be understood that the invention is not limited to the precise disclosure, but may be embodied in various arrangements and equivalent circuits. As many changes may be made without departing from the spirit of the invention, as will be apparent to those skilled in the art, reference will be had to the appended claims for a definition of the limits of the invention.

I claim:

1. A system for controlling the speed of a power plant driving a propeller, the blades of which are adjustable as to pitch, a mechanism to adjust blade pitch to change the speed of said power plant from one speed to a different predetermined speed, means responsive to the actual speed of said power plant and in accordance with the rate of acceleration thereof for rendering said mechanism non-operative at a predetermined time interval before said power plant attains said predetermined speed level, and means responsive to airspeed to vary the length of said predetermined time interval for varying the effect of the rate of acceleration in rendering said mechanism non-operative.

2. A system for controlling the speed of a power plant driving a propeller, including an internal combustion engine having an intake manifold, a propeller the blades of which are adjustable as to pitch, a mechanism to adjust blade pitch to change the speed of said power plant from one speed to a different predetermined speed, means responsive to the actual speed of said power plant and in accordance with the rate of acceleration thereof for rendering said mechanism non-operative at a predetermined time interval before said power plant attains said predetermined speed level, and means responsive to manifold pressure to vary the length of said predetermined time interval for varying the effect of the rate of acceleration in rendering said mechanism non-operative.

3. A system for controlling the speed of a power plant driving a propeller, the blades of which are adjustable as to pitch, a mechanism to adjust blade pitch to change the speed of said power plant from one speed to a different predetermined speed, means responsive to the actual speed of said power plant and in accordance with the rate of acceleration thereof for rendering said mechanism non-operative at a predetermined time interval before said power plant attains said predetermined speed level, and means responsive to manifold pressure and airspeed to vary the length of said predetermined time interval, for varying the effect of the rate of acceleration in rendering said mechanism non-operative.

4. A system for controlling the speed of a power plant driving a propeller, the blades of which are adjustable as to pitch, a mechanism to adjust blade pitch, said system having a certain order of lag in responding to calls for speed change, means for producing a voltage characteristic of the actual speed of said power plant, means responsive to said voltage for initiating the operation of said mechanism to correct the speed of said power plant, means responsive to said last mentioned means for feeding another voltage back and combining it with said first mentoined voltage during correction periods, thereby to damp operation of said voltage responsive means in consonance with the lag in the response of said power plant, a device sensitive to and operative in response to a power plant operating characteristic independent of power plant rotational speed, and means for varying said other voltage in response to operation of said device.

5. A system for controlling the speed of a power plant driving a propeller, the blades of which are adjustable as to pitch, a mechanism to adjust blade pitch, said system having a certain order of lag in responding to calls for speed change, means for producing a voltage characteristic of the actual speed of said power plant, means responsive to said voltage for initiating the operation of said mechanism to correct the speed of said power plant, means responsive to said last mentioned means for feeding another voltage back and combining it with first mentioned voltage during correction periods, thereby to damp operation of said responsive means in consonance with the lag in the response of said power plant, and means for varying said other voltage in response to airspeed.

6. A system for controlling the speed of an internal combustion engine driving a propeller, the blades of which are adjustable as to pitch and are actuated by a mechanism, said engine having lag in speed change response, said system including means for producing a voltage characteristic of the actual speed of said internal combustion engine, means for producing a second feedback voltage, a time-delay circuit through which said feedback voltage may be combined with said first mentioned voltage during correction periods to damp circuit operation in consonance with the lag in the response of said internal combustion engine, means for altering said combined voltage in response to a reduction in manifold pressure below a normal pressure range, and means responsive to the combined voltage for controlling the operation of said mechanism.

7. A system for controlling the speed of an aircraft power plant driving a propeller, the blades of which are adjustable as to pitch and are actuated by a mechanism, said power plant having lag in speed change response, said system including means for producing a voltage characteristic of the actual speed of said power plant, means responsive to said voltage for initiating the operation of said mechanism to correct the speed of said power plant, means for feeding a voltage back and combining it with said first mentioned voltage during correction periods, thereby to damp the operation of said voltage responsive means in consonance with the lag in the response of said power plant, and means for modifying said combined voltage in response to aircraft airspeed conditions.

8. A system for controlling the speed of an internal combustion engine driving a propeller, the blades of which are adjustable as to pitch and are actuated by a mechanism, said engine having lag in speed change response, said system including means for producing a voltage characteristic of the actual speed of said engine, means for producing a second feedback voltage, a time delay circuit through which said feedback voltage may be combined with said first mentioned voltage during correction periods to damp circuit operation in consonance with the lag in the response of said engine, means for altering said combined voltage in response to a change in power of said engine, and means responsive to the combined voltage for controlling the operation of said mechanism.

PAUL J. QUINN.

REFERENCES CITED

The following references are of record in the file of this patent:

UNITED STATES PATENTS

| Number | Name | Date |
|---|---|---|
| 1,127,012 | Kagi | Feb. 2, 1915 |
| 1,908,894 | Findley | May 16, 1933 |
| 2,217,364 | Halford et al. | Oct. 8, 1940 |
| 2,232,753 | Wilson | Feb. 25, 1941 |
| 2,272,664 | Gropler | Feb. 10, 1942 |
| 2,336,844 | Buck | Dec. 14, 1943 |
| 2,346,979 | Lilley | Apr. 18, 1944 |
| 2,347,104 | Hoover | Apr. 18, 1944 |
| 2,351,079 | Strobel | June 13, 1944 |
| 2,375,429 | Martin | May 8, 1945 |
| 2,381,250 | Baumann | Aug. 7, 1945 |
| 2,390,084 | Edwards | Dec. 4, 1945 |
| 2,391,323 | Martin | Dec. 18, 1945 |
| 2,399,685 | McCoy | May 7, 1946 |
| 2,407,317 | Mennesson | Sept. 10, 1946 |
| 2,414,430 | Nisbet | Jan. 14, 1947 |
| 2,428,702 | Elliot | Oct. 7, 1947 |
| 2,449,452 | Chillson | Sept. 14, 1948 |
| 2,455,378 | McCoy | Dec. 7, 1948 |
| 2,499,376 | Ferrill | Mar. 7, 1950 |